(12) United States Patent
Hsiung

(10) Patent No.: US 8,094,237 B2
(45) Date of Patent: Jan. 10, 2012

(54) SIGNAL SEPARATION APPARATUS APPLIED IN IMAGE TRANSMISSION SYSTEM AND RELATED METHOD

(75) Inventor: Chia-Hao Hsiung, Taipei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1491 days.

(21) Appl. No.: 11/548,693

(22) Filed: Oct. 11, 2006

(65) Prior Publication Data

US 2007/0126935 A1 Jun. 7, 2007

(30) Foreign Application Priority Data

Oct. 13, 2005 (TW) ................. 94135714 A

(51) Int. Cl.
*H04N 9/78* (2006.01)
(52) U.S. Cl. ...................................... 348/663
(58) Field of Classification Search .......... 348/663–670, 348/607, 611, 614, 618–621, 609
See application file for complete search history.

(56) References Cited

U.S. PATENT DOCUMENTS

| | | | |
|---|---|---|---|
| 4,334,244 A | 6/1982 | Chan et al. | |
| 4,935,806 A | 6/1990 | Rabii | |
| 5,119,179 A * | 6/1992 | Hagino | 348/663 |
| 5,148,274 A * | 9/1992 | Knauer et al. | 348/471 |
| 5,311,306 A * | 5/1994 | Tanaka et al. | 348/702 |
| 5,345,407 A * | 9/1994 | Hostetler | 708/300 |
| 5,426,470 A * | 6/1995 | Kita et al. | 348/668 |
| 5,548,342 A * | 8/1996 | Ikeda et al. | 348/668 |
| 5,920,357 A | 7/1999 | Ohara | |
| 6,380,973 B1 * | 4/2002 | Kawahara | 348/220.1 |
| 6,498,609 B1 | 12/2002 | De Haan | |
| 6,862,372 B2 | 3/2005 | Yang | |
| 7,110,045 B2 * | 9/2006 | Ishihara | 348/663 |
| 7,224,406 B2 | 5/2007 | Lee | |
| 7,289,163 B2 | 10/2007 | Lin | |
| 7,382,915 B2 | 6/2008 | Bala | |
| 7,689,026 B2 | 3/2010 | Fujii | |
| 2002/0140854 A1 | 10/2002 | Lan | |
| 2004/0155983 A1 * | 8/2004 | Topper | 348/624 |

FOREIGN PATENT DOCUMENTS

| | | | |
|---|---|---|---|
| JP | 63-260276 | 10/1988 | |
| JP | 2003018432 A * | 1/2003 | 5/21 |
| JP | 2004-166010 | 6/2004 | |
| KR | 2001-0005282 | 1/2001 | |

OTHER PUBLICATIONS

Al Bovik, "Handbook of Image and Video processing", p. 51-268, May 3, 1999.

* cited by examiner

*Primary Examiner* — Paulos Natnael
(74) *Attorney, Agent, or Firm* — Thomas, Kayden, Horstemeyer & Risley LLP

(57) ABSTRACT

A signal separation apparatus applied in an image transmission system for extracting a chrominance signal from an analog composite video signal and a related method are disclosed. The signal separation apparatus includes an analog-to-digital converter for generating a digital composite video signal by sampling the analog composite video signal; a median filter, coupled to the analog to digital converter, for generating a reference luminance signal according to the digital composite video signal; and a subtractor, coupled to the analog to digital converter and the median filter, for generating the chrominance signal according to a difference between the digital composite video signal and the reference luminance signal.

12 Claims, 2 Drawing Sheets

SIGNAL SEPARATION APPARATUS APPLIED IN IMAGE TRANSMISSION SYSTEM AND RELATED METHOD

BACKGROUND OF THE INVENTION

1. Field of the Invention

This invention relates to a signal separation apparatus and related method thereof, and more particularly, to a signal separation apparatus and related method applied in an image transmission system.

2. Description of the Prior Art

Color televisions had been invented for more than fifty years, and the composite video signal utilized by the color televisions includes a luminance signal and a chrominance signal, where a frequency of the luminance signal falls in the range from 0 Hz to 5.5 MHz and the chrominance signal is modulated on a carrier whose frequency falls in a range from 3.58 MHz to 4.43 MHz. Thus, the spectrum of the luminance signal and that of the chrominance signal overlaps while the color television receives above-mentioned composite video signal through a connector such as an AV connector. Therefore, methods for extracting the luminance signal and the chrominance signal from the composite video signal are an important issue in color television development. As is well known, separating the luminance signal Y and the chrominance signal C is commonly called Y/C separation.

Conventionally, a linear filter or a comb filer is used to perform the Y/C separation. Utilizing the linear filter to separate the luminance signal and the chrominance signal is a trivial task. However, since the spectrum of a chrominance signal overlaps the spectrum of the luminance signal, the linear filter may judge a high-frequency luminance signal as a chrominance signal erroneously. Additionally, because the high-frequency luminance signal commonly indicates the outline of an image object, utilizing a linear filter to perform Y/C separation may vague (i.e., blurred) the contour of the image object, and introduce cell contrast or stripe contrast around the outline. In order to solve the above-mentioned problems, the comb filter is used to perform the Y/C separation instead of the linear filter. However, while utilizing a comb filter to perform the Y/C separation, a related art image decoder has to determine an image corresponding to a target location in a picture as a still image, and then utilizes a 3D comb filter to perform an inter-field Y/C separation on the image located at the target location. Compared with the linear filter, the comb filter produces better Y/C separation result but its operation is more complex.

SUMMARY OF THE INVENTION

Thus, one objective of the claimed invention is to provide an apparatus and method for signal separation, to solve the problems described above.

According to the claimed invention, disclosed is a signal separation apparatus, which is applied in an image transmission system and is utilized to extracting a chrominance signal from an analog composite video signal. The signal separation apparatus comprises: an analog to digital converter, for generating a digital composite video signal by sampling the analog composite video signal; a median filter, coupled to the analog to digital converter, for generating a reference luminance signal according to the digital composite video signal; and a subtractor, coupled to the analog to digital converter and the median filter, for generating the chrominance signal according to the difference between the digital composite video signal and the reference luminance signal.

According to the claimed invention, a signal separation method is also disclosed. The signal separation method is applied in an image transmission system and is utilized to extracting a chrominance signal from an analog composite video signal. The method comprises: generating a digital composite video signal by sampling the analog composite video signal; generating a reference luminance signal by performing median computation according to the digital composite video signal; and generating the chrominance signal according to the difference between the digital composite video signal and the reference luminance signal.

The median filter, in addition to filtering high frequency signals effectively, also can retains the component of the luminance signal corresponding to the outline of images. Thus, the signal separation apparatus using a median filter has better image quality than the signal separation apparatus using a linear filter. Moreover, since the computation of the median filter is less complex than the related art comb filter, the signal separation apparatus according to the present invention may decrease the system computation loading under the circumstance of maintaining superior image quality.

These and other objectives of the present invention will no doubt become obvious to those of ordinary skill in the art after reading the following detailed description of the preferred embodiment that is illustrated in the various figures and drawings.

DETAILED DESCRIPTION

One embodiment of the signal separation apparatus of the present invention utilizes a median filter to separate high-frequency chrominance signal C from luminance signal Y. The median filter includes the ability to filter out most high-frequency signal components, but it can retain some of the specific high-frequency signal components. For example, if a digital signal to be processed is [12, 12, 12, 12, 18, 18, 18, 18], wherein each digital value represents a pixel data. Therefore, the digital value 12 indicates one kind of color in a frame, the digital value 18 indicates another kind of color in the frame, and the boundary of digital values 12 and 18 indicates an object outline in the frame. If a median filter and a low-frequency linear filter are both used to process the digital signal [12, 12, 12, 12, 18, 18, 18, 18], and the sliding window of the median filter and the low-frequency linear filter are both 3, then the pixel data [12, 12, 12, 12, 18, 18, 18, 18] is transferred to [12, 12, 12, 14, 16, 18, 18, 18] after processed by the linear filter. As a result, the original sharp outline becomes slightly vague. Compared with the linear filter, the output of the median filter remains [12, 12, 12, 12, 18, 18, 18, 18], and it is apparent that the output result of the median filter can retain the object outlines of the frame effectively.

Figure 1:
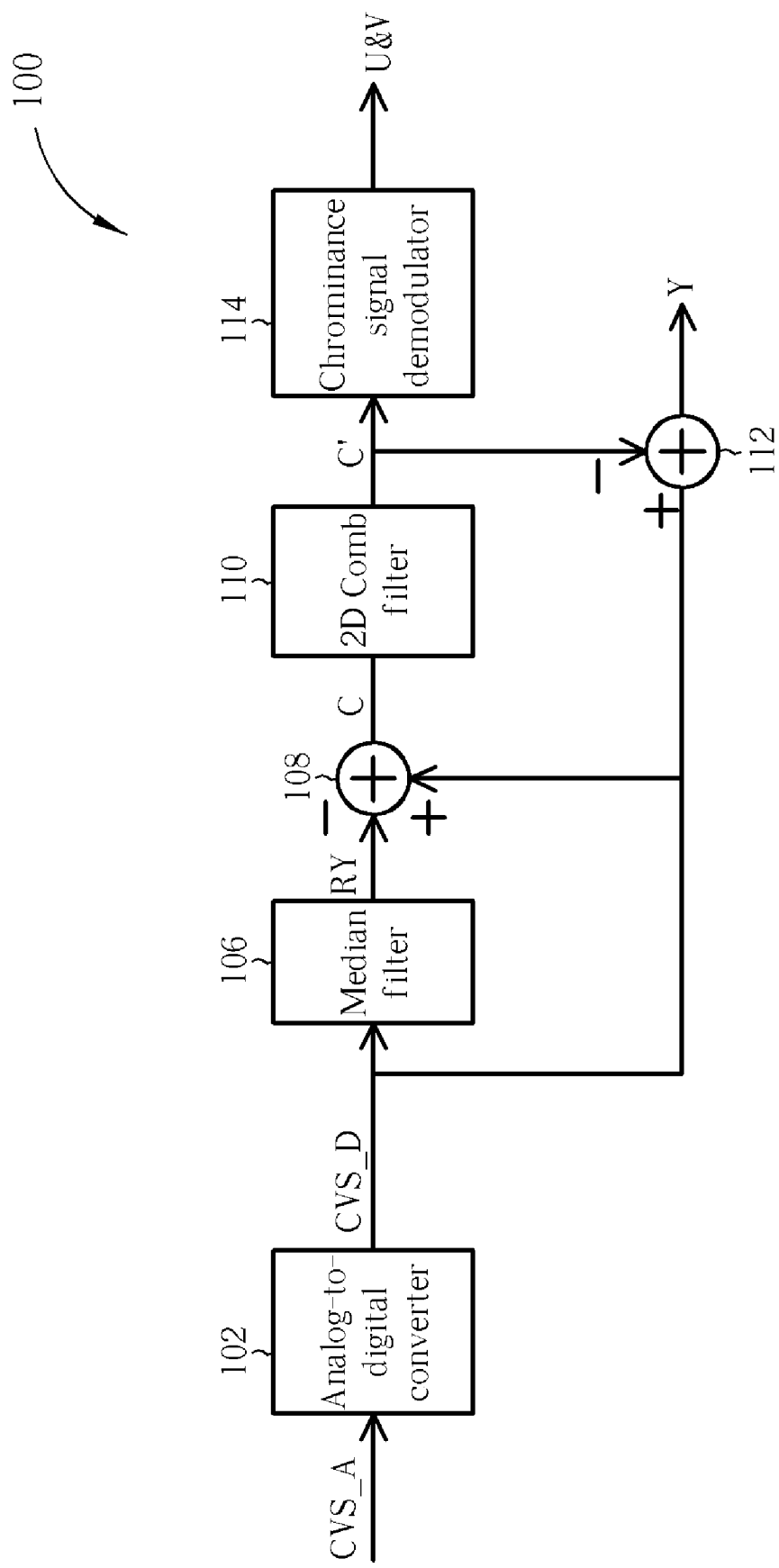
FIG. 1 is a functional block diagram illustrating a signal separation apparatus according to a preferred embodiment of the present invention, which is applied in an image transmission system.

Please refer to FIG. 1. FIG. 1 is a functional block diagram illustrating a signal separation apparatus 100 applied in an image transmission system according to a preferred embodiment of the present invention. The signal separation apparatus 100, in this embodiment, receives an analog composite video signal CVS_A from a connector such as an AV connector, and extracts a chrominance signal C and a luminance signal Y from the received analog composite video signal CVS_A. Also, the signal separation apparatus 100 generates a prior art UV signal according to the chrominance signal C. As shown in FIG. 1, the signal separation apparatus 100 includes an analog-to-digital converter 102, a median filter 106, a plurality of subtractors 108, 112, a 2D comb filter 110 and a chrominance signal demodulator 114.

As described above, the analog-to-digital converter 102 samples the analog composite video signal CVS_A to generate a digital composite video signal CVS_D. Since the digital composite video signal CVS_D is composed of a plurality of pixel data, the median filter 106 performs a median computation upon a plurality pixel data disposed at each horizontal scan line of the frame to generate a reference chrominance signal RY. The operation of the median filter 106 in this embodiment is described as below:

$$RY(I,j)=\text{median}[D(I,j-N_L),D(I,j+1-N_L),\ldots,D(i,j),\ldots,D(i,j+1),D(I,j+N_R)] \quad \text{equation (1)}$$

In equation (1), D(i,j) represents the $j^{th}$ pixel data on $i^{th}$ horizontal scan line. Moreover, according to equation (1), this embodiment utilizes the idea of using the sliding window to select the median number of the continuous ($N_L+N_R+1$) pixel data. It should be noted that the operation of the median filter 106 is not limited to that mentioned in this embodiment, and the description of which is detailed in the following paragraphs. Next, the subtractor 108 generates the chrominance signal C according to the digital composite video data CVS_D and the reference luminance signal RY.

In order to prevent chrominance signal C from including components of luminance signal Y mixed therein, this embodiment utilizes the 2D comb filter 110 to further process the chrominance signal C to output an filtered chrominance signal C'. Since the operation and the structure of the 2D comb filter 112 are well known by persons skilled in the art, a detailed description is omitted here for the sake of brevity. Finally, the subtractor 110 subtracts the digital composite video signal from the filtered chrominance signal C' to generate a luminance signal Y, and the prior art UV signal is generated from demodulating the filtered chrominance signal C' by the demodulator 114 accordingly.

It should be noted that, according to the present invention, the signal separation apparatus 100 can be configured with the 2D comb filter omitted, and the UV signal can be directly generated from demodulating the chrominance signal outputted from the subtractor 108. Additionally, a notch filter or low pass filter is further used to filter the digital composite video signal CVS_D to generate the luminance signal Y. Alternatively, the signal separation apparatus according to the present invention can directly use the reference luminance signal RY outputted from the median filter 106 as the desired luminance signal Y. In other words, the scope of the present invention is not limited to the aforementioned embodiment.

Figure 2:
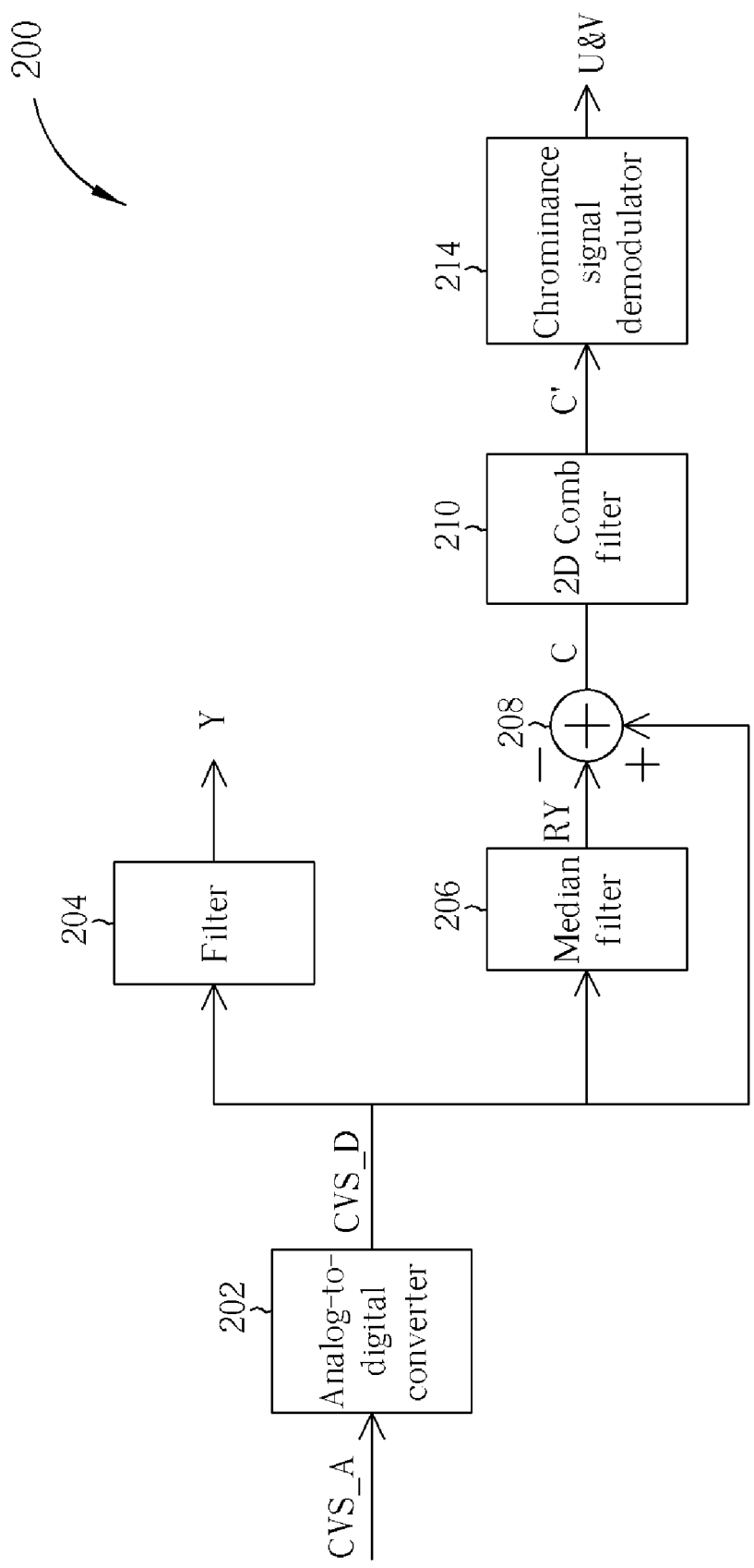
FIG. 2 is a functional block diagram illustrating a signal separation apparatus according to another embodiment of the present invention.

What is described below is the embodiment of generating a luminance signal Y by filtering the digital composite video signal CVS_D utilizing a notch filter or low pass filter. Please refer to FIG. 2. FIG. 2 is a functional block diagram illustrating a signal separation apparatus 200 according to another embodiment of the present invention. As shown in FIG. 2, the signal separation apparatus 200 includes an analog-to-digital converter 202, a filter 204, a median filter 206, a subtractor 208, a 2D comb filter 210 and a chrominance signal demodulator 214. The primary difference between the signal separation apparatus 200 and the signal separation apparatus 100 is that the signal separation apparatus 200 utilizes the filter 204 to generate the luminance signal Y. Accordingly, in this embodiment, the filter 204 is a notch filter or low pass filter. Since the operation of generating the luminance signal Y utilizing a notch filter or low pass filter is well known by persons skilled in the art, further description is omitted for the sake of brevity.

It should be noted that, the median filters 106, 206 are well-known prior art devices, and the operation of which is not limited to the above-mentioned embodiment. For example, "Handbook of Image & Video Processing" written by Al Bovik discloses a weighted median smoother (page 83). Assume that the dimension of the sliding window used by the weighted median filter is 5D and the weighted vector is [1, 2, 3, 2, 1]. Therefore, the weight of value 21 is the highest and the weight of the value 12 and 8 is the lowest while the values in the sliding window is [12, 11, 21, 22, 8]. In this case, the weighted median smoother generates a new digital value set [12, 11, 11, 21, 21, 21, 22, 22, 8] according to the weight of each value, and selects a median value from the new generated digital value set. Also found on page 82 is Bovik's disclosure of a recursive median smoother, and the operation of which is described as below:

$$y(n)=\text{median}[y(n-2),y(n-1),x(n),x(n+1),x(n+2)] \quad \text{equation (2)}$$

According to equation (2), the primary characteristic of the recursive median smoother is its operation of replacing the original input with the result of the median computation, i.e., replacing y(n) with x(n). In addition to the weighted median filter and the recursive median smoother, the other kinds of filters with the ability to sort data can be applied in the signal separation apparatus of the present invention to perform the median filtering function. Additionally, the signal separation apparatus according to the present invention can utilize storage units such as buffer memories to buffer and store the data to be processed to meet the computation timing of each computation unit. Also, since the use of the storage unit is well known by persons skilled in the art, further description is omitted for the sake of brevity.

Briefly summarized, since the median filter not only can filter chrominance signal effectively but also can keep the components corresponding to the object outline in the luminance signal, the present invention utilizes a median filter to generate a reference luminance signal and then produces a chrominance signal according to the reference luminance signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal separation apparatus applied in an image transmission system to extract a chrominance signal from an analog composite video signal, the signal separation apparatus comprising:

an analog-to-digital converter, for generating a digital composite video signal by sampling the analog composite video signal;

a median filter, coupled to the analog-to-digital converter, for generating a reference luminance signal according to the digital composite video signal; and a subtractor, coupled to the analog-to-digital converter and the median filter, for generating the chrominance signal according to a difference between the digital composite video signal and the reference luminance signal a comb filter, coupled to the subtractor, for generating a filtered chrominance signal according to the chrominance signal; and a subtractor, coupled to the comb filter and the analog to digital converter, for generating a luminance signal of the analog composite video signal according to the difference between the digital composite video signal and the filtered chrominance signal;

wherein the digital composite video signal comprises a plurality of pixel data corresponding to at least one horizontal scan line in a frame, and the median filter performs a median computation upon a plurality of pixel data at the same horizontal scan line to generate the reference luminance signal.

2. The signal separation apparatus of claim 1, wherein the reference luminance signal is a luminance signal of the analog composite video signal.

3. The signal separation apparatus of claim 1, further comprising:

a notch filter or a low pass filter, for filtering the digital composite video signal to generate a luminance signal of the analog composite video signal.

4. A signal separation method applied in an image transmission system to extract a chrominance signal from an analog composite video signal, the signal separation method comprising:

generating a digital composite video signal by sampling the analog composite video signal, wherein the digital video signal comprises a plurality of pixel data corresponding to at least one horizontal scan line in a frame;

generating a reference luminance signal by performing a median computation upon a plurality of pixel data at the same horizontal scan line of the digital composite video signal; and generating the chrominance signal according to a difference between the digital composite video signal and the reference luminance signal generating a filtered chrominance signal by performing comb filtering according to the chrominance signal; and generating a luminance signal of the analog composite video signal according to the difference between the digital composite video signal and the filtered chrominance signal.

5. The signal separation method of claim 4, wherein the reference luminance signal is a luminance signal of the analog composite video signal.

6. The signal separation method of claim 4, further comprising:

notch filtering or low pass filtering the digital composite video signal to generate a luminance signal of the analog composite video signal.

7. A signal separation apparatus for extracting a high-frequency signal from a digital signal, the signal separation apparatus comprising:

a filter, having data arranging ability, for arranging values of the digital signal to generate a reference low-frequency signal; and a subtractor, coupled to the filter, for generating the high-frequency signal according to a difference between the digital signal and the reference low-frequency signal;

a comb filter, coupled to the subtractor, for generating act a filtered high-frequency signal according to the high-frequency signal; and a subtractor, coupled to the comb filter, for generating a low-frequency signal of the digital signal according to the difference between the digital signal and the filtered high-frequency signal.

8. The signal separation apparatus of claim 7, wherein the reference low-frequency signal is a low-frequency signal of the digital signal.

9. The signal separation apparatus of claim 7, further comprising:

a notch filter or a low pass filter, for filtering the digital signal to generate a low-frequency signal of the digital signal.

10. The signal separation apparatus of claim 7, wherein the filter is a median filter.

11. The signal separation apparatus of claim 7, further comprising:

an analog-to-digital converter, for converting an analog signal to the digital signal.

12. The signal separation apparatus of claim 11, wherein the analog signal is a composite video signal, the high-frequency signal is a chrominance signal, and the reference low-frequency signal is a reference luminance signal.

* * * * *